Figure 1:
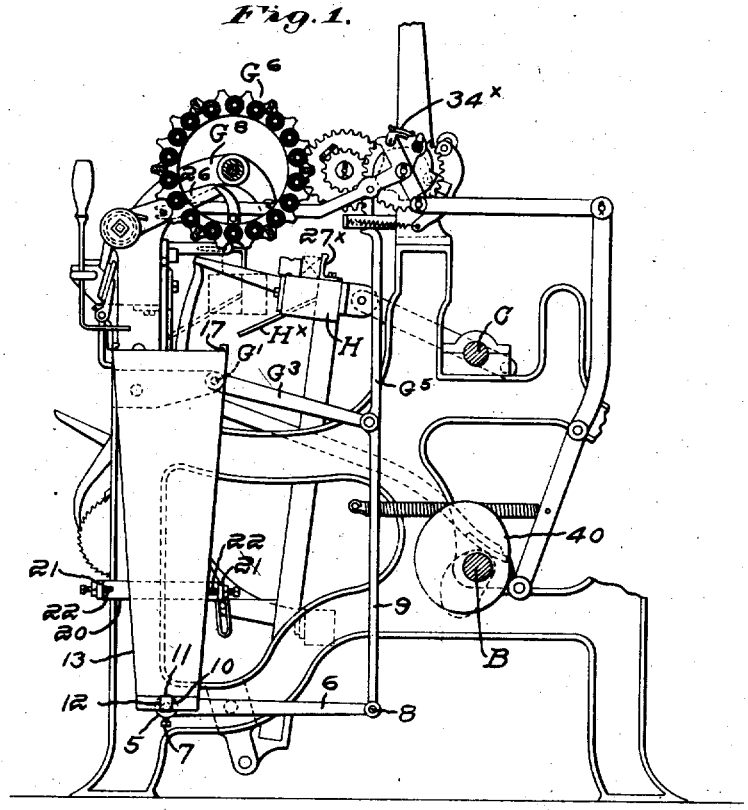

R. CROMPTON.

AUTOMATIC FILLING REPLENISHING LOOM.

APPLICATION FILED OCT. 11, 1913.

Reissued July 20, 1915.

13,948.

*Witnesses:*

Carl L. Choate.

Horace A. Brouwman

*Inventor:*

*Randolph Crompton,* by Emery, Booth, Janney and Varney,

*Attys.*

UNITED STATES PATENT OFFICE.

RANDOLPH CROMPTON, OF CHATHAM, MASSACHUSETTS.

AUTOMATIC FILLING-REPLENISHING LOOM.

13,948. Specification of Reissued Letters Patent. Reissued July 20, 1915.

Original No. 1,057,411, dated April 1, 1913, Serial No. 714,370. Application for reissue filed October 11, 1913. Serial No. 794,735.

*To all whom it may concern:*

Be it known that I, RANDOLPH CROMPTON, a citizen of the United States, and a resident of Chatham, in the county of Barnstable and State of Massachusetts, have invented an Improvement in Automatic Filling-Replenishing Looms, of which the following description, in connection with the accompanying drawings, is a specification, like characters on the drawings representing like parts.

This invention relates particularly but not wholly to automatic filling replenishing looms of the type wherein more than one kind of filling is used in the weaving, and generally speaking the difference in the filling is in the color thereof, filling of one color being used for a certain number of picks, and then filling of another color is used, and so on, according to some predetermined order or sequence.

That class of looms wherein the working shuttle is provided automatically with a fresh supply of filling when occasion demands has been arranged for use with a plurality of distinctive kinds of filling, so that the working shuttle is replenished with the proper kind of filling when replenishment is called for. Such a loom forms the subject matter of United States Patent No. 600,121, granted March 1, 1898, to me and another, and in the structure therein disclosed a plurality of distinctively different kinds of filling are used, in connection with a plurality of shuttles, but one shuttle being in operation at any given time, and each shuttle is arranged to contain one particular kind of filling. When the supply of filling in the working or active shuttle requires replenishment the fresh supply of filling furnished thereto is of the same kind as that previously carried thereby, and the different shuttles are controlled as to their activity by a shifting shuttle-box mechanism. In looms of this type the filling-carriers or bobbins ejected from the shuttles have more or less filling thereon, and this filling is stripped from the carriers by hand or mechanically and must be disposed of as waste, the waste so resulting, in a large weaving mill, amounting to a very considerable and direct loss in the course of a year.

When a plurality of kinds of filling are used in the looms it will be apparent that the waste contains all kinds, indiscriminately, and if for any reason it is desirable to have the different kinds of filling separated the assorting and separation must be effected before the carriers are stripped. Such assorting, when a large number of looms is involved, would require such an outlay for labor as to be practically prohibitive.

I have in view certain means for utilizing and saving substantially all of the filling which heretofore has been termed waste, and to carry out such means it is necessary that the ejected filling-carrier must be assorted or separated in accordance with the distinctive characteristics of the different kinds of filling.

My present invention has for one of its objects the production of means whereby the filling-carriers ejected from the active shuttle during the operation of the loom will be separated automatically in accordance with the different characteristics of the several kinds of filling in use. By my invention the manual labor and expenditure of time and money which would otherwise be necessary to effect such separation or segregation of the different kinds of spent filling is altogether avoided.

The various novel features of my invention will be fully described in the subjoined specification and particularly pointed out in the following claims.

In the present instance I have illustrated my invention in connection with a loom such as is disclosed in the above mentioned patent, for convenience, but it is to be understood that my invention is not in any way thereby restricted to that particular type of loom, for the invention is applicable to any automatic filling replenishing loom wherein a plurality of distinctively different kinds of filling are used, and it is desirable to maintain separated from each other the different kinds of spent filling supplies.

Figure 2:
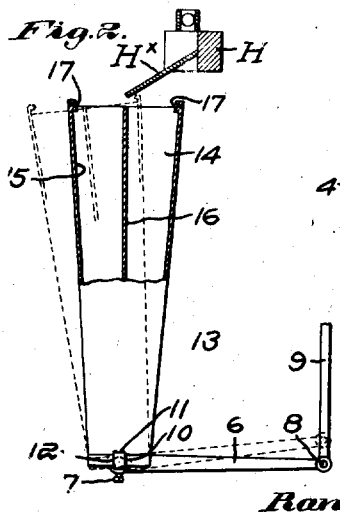
Figure 3:
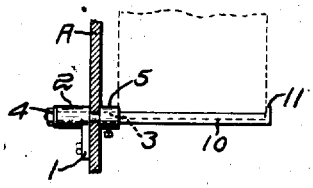
Figure 4:
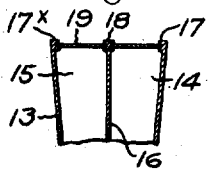

Figure 1 is a right hand side elevation and partial section of a sufficient portion of a loom such as hereinabove referred to, with one practical embodiment of my present invention in operative connection therewith; Fig. 2 is a detail in side elevation and section of the receptacle for the spent supplies of filling, shown in two positions, and with some of its adjuncts, to be referred to; Fig. 3 is a detail in front elevation of the rocking support for the receptacle, and the bearing therefor on the loom side; Fig. 4 is a detail view of a modified form of cover or closure for the receptacle.

Referring to Fig. 1, the crank-shaft C, cam-shaft B, having a cam 40 thereon, the lay H having at the replenishing side of the loom a shuttle-box $27^{\times}$, and at its opposite side a shifting, multiple-cell, shuttle box (not shown); the rock shaft G′ appropriately connected with the usual shuttle-box shifting mechanism and having a rigid arm $G^3$ pivotally connected with a rack bar $G^5$, the filling feeder or magazine $G^6$, and the transferrer arm 26, may be and are all substantially as in the patent referred to, the magazine being mounted rotatably on an arm $G^8$. The shuttle-box shifting mechanism is shown in Fig. 2 of the patent referred to and is of such a well known type that illustration and description herein is unnecessary to a proper understanding of my invention.

By the rock shaft G′ and its connections with the box-shifting mechanism and the rack respectively, means is provided for effecting a backward and forward movement of the magazine $G^6$ in unison with the rising and falling movements of the shuttle box, the rack $G^5$ acting upon the magazine through the adjacent train of gearing shown in Fig. 1. A second and different movement of the magazine comes into play only after a transfer of filling from the magazine to the active shuttle, to skip from one group of filling carriers to the next group and place in operative position the latter group, with a filling supply of the proper character in position for transfer. The filling carriers are arranged in the magazine in groups, each group having as many carriers as there are different kinds of filling, corresponding to the number of cells of the shifting shuttle box and its shuttles.

For convenience I have herein arranged my invention for coöperation with a two celled box, as in the patent referred to, so that each group in the magazine consists of two filling carriers provided, for example, with red and white filling, respectively. If the shuttle carrying red filling is in action the corresponding cell of the shifting box stands at the level of the raceway of the lay, and the red filling in one of the groups of filling carriers will then be positioned for transfer, the rack $G^5$ remaining quiescent. Should a shaft of the shifting shuttle box be made, however, bringing into action the shuttle carrying white filling, the shaft G′ will be rocked, the arm $G^3$ is swung, and the rack $G^5$ is moved to effect a rotative movement of the magazine $G^6$ far enough to bring the carrier having white filling into position for transfer. Thus the shifting of the shifting shuttle box brings about a corresponding movement of the magazine to preserve the proper relative arrangement of the kinds of filling in a group.

When replenishment is called for, the same kind of filling is transferred to the active shuttle as that previously therein, and the more or less spent filling carrier is ejected from the shuttle and discharged from the lay while the shuttle is in the box $27^{\times}$, the discharged filling carrier passing over an inclined guide chute $H^{\times}$ on the lay and of usual construction, the lay always being at a given point when a spent filling carrier is ejected, indicated by the dotted lines in Fig. 1. Thereafter a new and different motion is imparted to the magazine to bring into position another and complete group of carriers, and to take the place of the group from which a filling carrier has just been taken and transferred to the shuttle. This second motion or movement of the magazine is effected by the operation of a pawl $34^{\times}$ actuated by the cam 40 through intervening devices, as in the patent referred to, but said pawl is permitted to act only when a change of filling is effected.

I have described a sufficient portion of the mechanism of Fig. 1 to enable the same to be understood, and it will be apparent that all filling carriers, irrespective of the character of the filling thereon, will be discharged when the lay is in dotted line position, and heretofore said filling carriers have been received in a common receptacle, thereafter requiring assortment and separation by hand.

I will now describe one practical means whereby the discharged filling carriers are maintained separated and assorted automatically in accordance with their different characteristics. For example, all those containing white filling will be separated automatically from all of those containing red filling. On the lower part of the loom side A at the replenishing side of the loom is fixed a bracket 1, Fig. 3, having a horizontal sleeve-like bearing 2 in which is mounted a rock shaft 3 extended laterally through the loom side and retained in place at its inner end by a nut and washer at 4. Adjacent and outside the loom side the hub 5 of a rearwardly extended arm 6 is fixedly held on the rock shaft by a set screw 7, Figs. 1 and 3. The free end of the arm is jointed at 8 to a link 9, which may be an extension of the rack $G^5$, or a separate member attached thereto, so that every time said rack is raised or lowered the arm 6 will be raised or lowered, and the rock shaft 3 will be turned correspondingly through a small angle. Beyond the hub 5 the rock shaft is made preferably square in cross section, at 10, and at its extremity it has a short upturned lip 11, the extension 10 being adapted to fit snugly into a correspondingly shaped notch 12 in the bottom of an upright receptacle 13, held from longitudinal movement by the hub 5 and lip 11. This receptacle or box 13 is of sufficient depth to bring its open top just below the path of movement of the guide chute $H^x$ on the lay, and the receptacle is divided into as many compartments as there are different kinds of filling being used. Herein there are two compartments, 14, 15, separated by a transverse partition 16 extending from the top to the bottom of the receptacle.

If the red filling is being woven into the cloth when the various parts of the apparatus are positioned as shown in Fig. 1 it will be obvious that when the lay is in dotted line position the guide chute $H^x$ projects across the open mouth of the compartment 14, and upon replenishment the discharged filling carrier will pass from said chute into the front compartment 15, the corresponding position of the receptacle 13 and lay being shown in full lines in Fig. 2. That is, all the filling carriers containing red filling will when ejected be thrown into the compartment 15 of the receptacle 13. Now when a change in the character of the filling is called for, viz: from red to white, the shifting of the shifting shuttle-box will rock the shaft G′ and raise the rack $G^5$, and through the member 9 the arm 6 will be swung upward to dotted line position, Fig. 2, and as the supporting rock shaft 3 is thereby turned the receptacle 13 will be swung frontward to dotted line position, Fig. 2. This movement carries the open mouth of the compartment 15 away from the lower end of the chute $H^x$ when the lay beats up, and brings the mouth of the rear compartment 14 into position to receive a discharged filling carrier as it passes from the chute, as will be obvious from an inspection of Fig. 2. Consequently all of the filling carriers having white filling thereon will be delivered into said compartment 14, and this will continue until there is another operation of the box shifting mechanism, whereupon the receptacle 13 will be returned to full line position. It will thus be apparent that whenever a change in the character of the filling is brought about an automatic and corresponding change is effected in the position of the spent carrier receptacle, so that the particular compartment for the carriers having a certain kind or character of filling thereon will always be positioned for their reception when ejected from the active shuttle. Thereby the separation of the filling carriers is effected and maintained, so that when the receptacle is full it can be lifted off the end 10 of the rocking support, and removed, the contents of one compartment being emptied into one bin or box and then the contents of the other compartment are emptied into another bin.

The front and back walls of the receptacle may be grooved, as at 17, Figs. 1 and 2, for the reception of a flat slide or cover, used when the filled receptacle is taken from the loom to be emptied, or the partition 16 may be provided with a double grooved head 18, Fig. 4, so that separate slides or covers 19 may be used, fitting into the grooved head and into the grooves $17^x$ in the front and rear walls of the receptacle. Any number of compartments may be provided, depending on the number of different kinds or colors of filling being used, as will be obvious, provided that the positioning of the different compartments is controlled by the mechanism which governs or determines the particular kind of filling to be furnished at any given time to the active shuttle.

I have provided limiting stops for the receptacle, to relieve the controlling means therefor from any undue strain which might be exerted by the momentum of the receptacle, particularly when containing a considerable number of spent filling carriers. To this end a bracket 20 on the loom side A has lateral ears 21, Fig. 1, in front of and behind the receptacle 13, said ears carrying oppositely extended stop screws 22, and by adjusting the latter the receptacle is supported by one or the other of the screws according to the angular position of the rocking support 3.

While I have shown and described one practical embodiment of my invention it is to be understood that various changes or modifications may be made by those skilled in the art without departing from the spirit and scope of my invention as set forth in the claims hereunto annexed.

I claim—

1. In a shifting shuttle box loom having a plurality of shuttles each adapted to contain distinctive filling, and having mechanism to replenish automatically the active shuttle with its distinctive filling, in combination, a plurality of receiving compartments for spent filling supplies, corresponding to the number of shuttles, and means controlled automatically by or through shifting of the shuttles to cause a spent filling supply to enter the compartment corresponding to the shuttle from which such filling supply was ejected.

2. In a loom provided with means to render active any one of a plurality of shuttles each adapted to contain distinctive filling, and having mechanism to replenish automatically the active shuttle with its distinctive filling, in combination, a receptacle for spent filling, having a plurality of compartments corresponding to the number of shuttles, and means to cause a spent filling supply to enter the compartment of said receptacle, corresponding to the particular shuttle from which it was ejected.

3. In a loom having a plurality of shuttles adapted to contain distinctively different supplies of filling, mechanism to replenish automatically the active shuttle with its distinctive filling, and means to govern the order of activity of said shuttles, in combination, a receptacle for spent filling, having a plurality of compartments corresponding to the number of shuttles, and means actuated by the shuttle governing means to position operatively that compartment of the receptacle corresponding to the particular shuttle in action, said positioning means acting when a shift of shuttles is effected.

4. In a shifting shuttle box loom having a plurality of shuttles, each adapted to contain distinctive filling, and having mechanism to replenish automatically the active shuttle with its distinctive filling, in combination, a receptacle having a plurality of compartments for spent filling supplies, corresponding to the number of shuttles, a movable support on which the receptacle is mounted detachably in position for the reception of spent filling when replenishment is effected, and means to move said support, and thereby the receptacle, whenever a shift of shuttles is effected, thereby to bring into receptive position that compartment corresponding to the shuttle in action.

5. In a loom having mechanism to furnish different kinds of filling in a predetermined sequence and to replenish the active shuttle with the proper kind of filling when replenishment is called for, in combination, a plurality of receiving compartments for the spent filling supplies, the compartments corresponding to the number of kinds of filling, and means to effect automatically the distribution of the different kinds of spent filling supplies into their respective compartments.

6. In an automatic replenishing loom, the combination with means for automatically ejecting spent filling carriers, a plurality of receiving compartments for the said ejected carriers, and means coöperating with said ejecting means and said compartments for depositing said carriers in said compartments in accordance with the distinctively different kinds of filling.

7. In an automatic replenishing loom, the combination with means for automatically ejecting spent filling carriers of co-acting means timed in action with the action of said ejecting means for separating the ejected carriers in accordance with the different kinds of filling.

8. In an automatic replenishing loom, the combination with means for automatically ejecting spent filling carriers, of co-acting means timed in action with the action of said ejecting means for separating the filling carriers as ejected, in accordance with the different kinds of filling.

9. In an automatic replenishing loom, the combination with means for automatically ejecting spent filling carriers, of co-acting means timed in action with the action of said ejecting means for separating the filling carriers as ejected, in accordance with the different characteristics of said filling carriers.

10. In an automatic replenishing loom, the combination with means for automatically ejecting differently characterized spent filling carriers, a plurality of receiving compartments for ejected spent filling carriers corresponding to the different characterizations of said carriers, and means controlled automatically by or through changed characterization of the running filling, to cause an ejected filling carrier to enter the compartment corresponding to the characteristic of the ejected filling carrier.

11. In an automatic replenishing loom, the combination with mechanism for automatically replenishing the filling and automatically ejecting differently characterized spent filling carriers, a plurality of receiving compartments for ejected spent filling carriers corresponding to the different characterizations of said carriers, and means controlled automatically by or through changed characterization of the running filling, to cause an ejected spent filling carrier to enter the compartment corresponding to the characteristic of the ejected spent filling carrier.

12. In an automatic replenishing loom, the combination with mechanism for automatically replenishing the filling and automatically ejecting spent filling carriers, a plurality of receiving compartments for the ejected spent carriers, and means operatively connected with said replenishing mechanism and said receiving compartments for depositing said carriers in said compartments in accordance with the distinctively different kinds of filling.

13. In an automatic replenishing loom, the combination with means for automatically replenishing the filling and automatically ejecting spent filling carriers, of co-acting means timed in action with the action of said replenishing mechanism for separating the ejected carriers in accordance with the different kinds of filling.

14. In an automatic replenishing loom, the combination with mechanism for automatically replenishing the filling and automatically ejecting spent filling carriers, of co-acting means timed in action with the action of said replenishing mechanism for separating the filling carriers as ejected, in accordance with the different kinds of filling.

15. In an automatic replenishing loom, the combination with mechanism for automatically replenishing the filling and automatically ejecting spent filling carriers, of co-acting means timed in action with the action of said replenishing mechanism for separating the filling carriers as ejected, in accordance with the different characteristics of said filling carriers.

16. In a loom, a filling changing mechanism, means to operate said mechanism, including means for ejecting spent filling carriers, and co-acting means timed in action with the action of said filling changing mechanism for separating the filling carriers as ejected in accordance with the different characterizations of said filling carriers.

17. In a loom having a lay, a filling changing mechanism and means for operating the same, a receptacle having compartments for the reception of the discharged, spent filling carriers, and means timed in action with the action of said filling changing mechanism to control said compartments to admit a spent filling carrier therein or to exclude the same.

18. In an automatic replenishing loom, the combination with means for automatically ejecting spent filling carriers, a plurality of receiving compartments for the said ejected carriers, and means timed in action with the action of said ejecting means to impart a shifting movement to said plurality of compartments in accordance with the distinctly different kinds of filling of the filling carriers, and thereby to present to the carrier being ejected the compartment corresponding to the characteristic of said carrier, whereby the ejected carriers are separated in accordance with the distinctively different kinds of filling thereof.

In testimony whereof, I have signed my name to this specification, in the presence of two subscribing witnesses.

RANDOLPH CROMPTON.

Witnesses:

MAY H. LOWRY,

ROBERT H. KAMMLER.